United States Patent Office 3,002,522
Patented Oct. 3, 1961

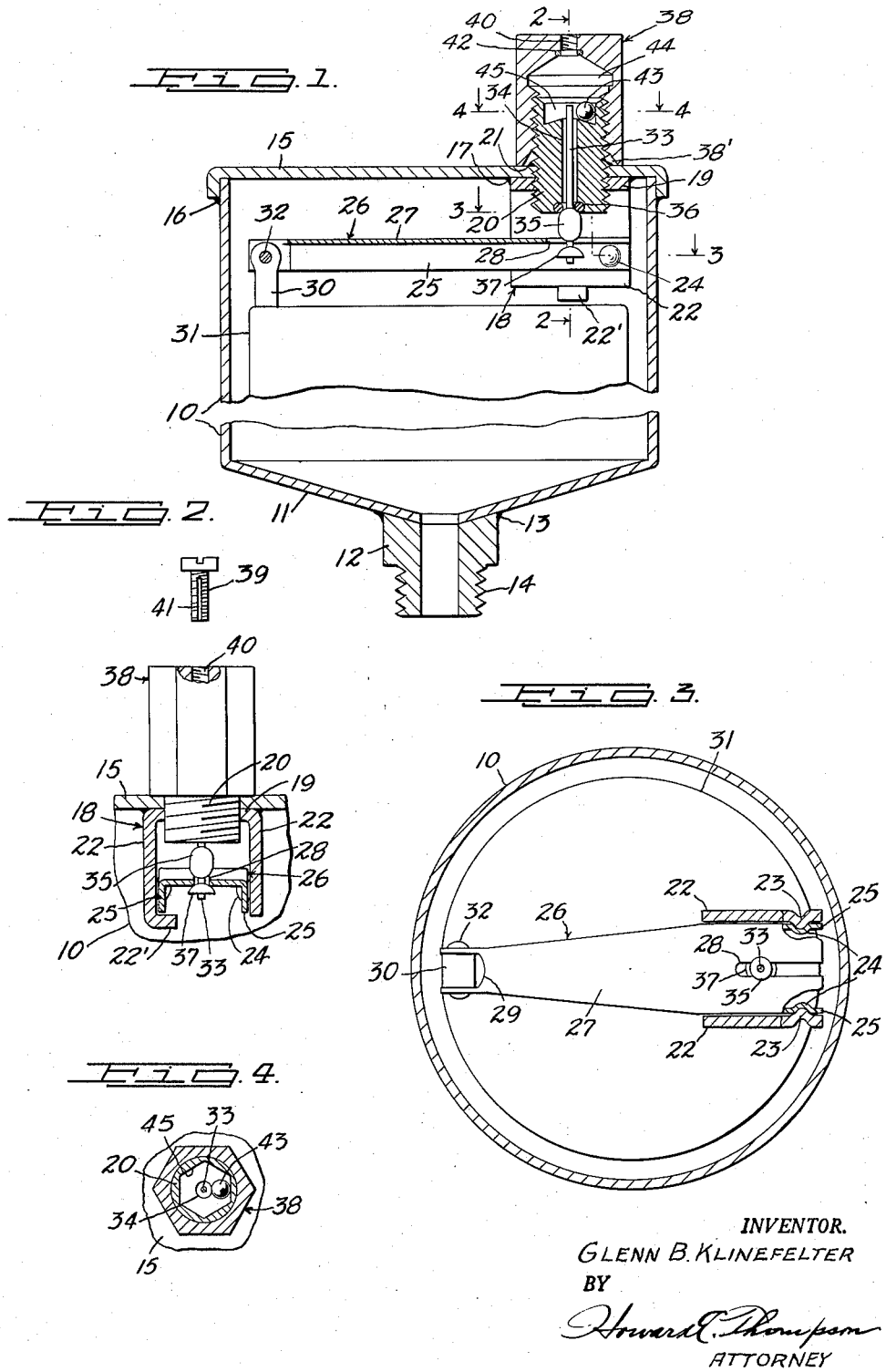

3,002,522
AIR VALVES
Glenn B. Klinefelter, Mountainside, N.J., assignor to Gorton Heating Corporation, Cranford, N.J., a corporation of New York
Filed Mar. 25, 1959, Ser. No. 801,909
5 Claims. (Cl. 137—202)

This invention relates to air valves for use in connection with hot water and other fluid systems for the releases of air in the system. More particularly, the invention deals with a valve of the character described, having a safety check cap, within which is disposed a buoyant ball valve for shutting off discharge of water or liquid from the system in the event of leakage of water by the normal check valve and, thus, prevent discharge of water through the air discharge in the event of such improper functioning of the valve system.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged sectional view through a valve made according to my invention, with parts of the construction broken away and parts shown in elevation.

FIG. 2 is a partial section on the line 2—2 of FIG. 1, with parts shown in elevation and part broken away.

FIG. 3 is a sectional plan on the broken line 3—3 of FIG. 1; and

FIG. 4 is a sectional view on the line 4—4 of FIG. 1.

In FIG. 1 of the drawing, I have shown at 10 the casing of the valve, preferably employing a depending contracted bottom wall 11, to which a suitable fitting 12 is fixed by soldering or welding, as indicated diagrammatically at 13, the fitting being threaded, as at 14, to be coupled with a hot water or other fluid system in connection with which the valve is employed.

The top of the casing 10 includes a cover 15, preferably soldered in position, as indicated at 16, to become a permanent part of the casing. Soldered or otherwise secured to the inner surface of the cover 15, as indicated at 17, is a substantially U-shaped bracket 18. The crosshead 19 of the bracket and the cover 15 have a threaded bore for reception of a valve plug 20. This can be a detachable mounting but, in some instances, the plug can be secured in position by soldering, as diagrammatically indicated at 21.

At 22 I have shown the depending side walls of the bracket 18, note FIGS. 2 and 3, and these walls have, adjacent the boundary wall of the casing 10, inwardly set pivot portions 23, clearly shown in FIG. 3 of the drawing, which seat and operate in correspondingly formed pivot portions 24 in the side walls 25 of a lever arm 26, the arm being channel-shaped in cross-sectional form throughout the major portion of its length.

The top crosshead wall 27 of the arm 26, has, at the wide pivot end portion thereof, an elongated aperture 28 opening through the end of the arm and this wall 27 is cutaway, as seen at 29, at the other contracted end, for coupling a pivot post 30 of a float 31 with said contracted end of the arm through the medium of a transverse rivet pivot pin 32. It will be understood that, in FIG. 1 of the drawing, only the upper end portion of the float 31 is shown, the float being smaller in diameter than the internal diameter of the casing 10 and the lower end of the float terminating short of the bottom wall 11, at least when the float is in its fully raised position, as is indicated in FIG. 1 of the drawing.

Mounted in the aperture 28 is a valve stem 33 which operates in a larger diameter bore 34 in the plug 20. Suitably fixed to the stem 33 is a more or less elliptical valve element 35 having rounded upper and lower surfaces. This element is adapted to seat upon a neoprene or other O-ring 36 mounted in the lower end portion of the plug 20 in checking discharge of air from the casing through the bore 34.

In FIG. 2 of the drawing, the valve element 35, including the arm 26, are illustrated in the lowered or open position and, in this connection, it will be apparent that downward movement of the arm 26 is checked by an inwardly extending stop flange 22' on at least one wall 22 of the bracket 18, as clearly illustrated in FIG. 2.

The stem 33 and the valve element 35 are moved into the open position by engagement of the top wall 27 of the arm with a half-rounded valve actuating member 37 fixed to the stem 33 in spaced relation to the element 35 and operating upon the undersurface of the top wall 27. In other words, as the arm 26 swings downwardly, it engages the member 37 to draw the stem 33 and element 35 downwardly into the position, as diagrammatically illustrated in FIG. 2 of the drawing. As the water rises in the valve casing, the float 31 will move the arm 26 upwardly to move the element 35 into seated position, as diagrammatically shown in FIG. 1.

In the lower position of the valve stem 33, the upper end thereof will still project to a slight degree above the plug 20 to be engaged by the finger or a tool upon removal of a cap 38 or this stem can further be operated by a screw 39, note FIG. 2, operating in the threaded bore 40 of the cap 38, the screw having an air vent passage longitudinally thereof, as indicated at 41 in FIG. 2 of the drawing.

In the initial installation of the valve and putting the hot water or other system into operation, the screw 39 is lowered sufficiently to bring the head of the screw into seated position upon the upper end of the cap, thus closing the vent 41. In this position, the screw projects sufficiently into the chamber 44 to prevent the ball 43 from seating on the O-ring 42. The liquid of the system is now introduced and, in this operation, it will be understood that air will be placed under pressure in the closed valve by reason of sealing of the vent 41. After all of the system has been filled with water, then the screw 39 is raised to expose the vent 41 to allow the entrapped air to discharge slowly from the valve; thus allowing the water of the system to rise sufficiently until the float 31 moves the valve element 35 into closed position; after which, the screw 25 can be removed and discarded. By utilizing this control, the depositing of foreign particles which may prevail in a system in the valve casing or around the valve parts is eliminated.

The cap 38 is internally threaded to engage the plug 20 and is moved into engagement with the outer surface of the cover 15, the bore of the cap 38 being flared outwardly at its lower end, as indicated at 38'. The inner end of the threaded bore 40 supports a neoprene or other O-ring 42, in connection with which a buoyant check valve 43 operates. The cap 38 has an enlarged chamber, as at 44, for free actuation of the valve 43 and, normally, the valve 43 will seat in a hexagon chamber 45 in the upper end of the plug 20, as diagrammatically illustrated in FIGS. 1 and 4 of the drawing. The hexagon wall chamber forms a socket for a wrench, facilitating attachment and detachment of the plug 20, as will be apparent.

It will be apparent that the aperture 28 opens through the end of the wall 27 and this facilitates assemblage of the stem 33 and its associated parts with the arm 26. It will also appear that, in providing the pivotal mounting of the arm solely at the sides of the arm, the channel portion of the arm becomes clear for free movement of the valve stem assemblage. From a consideration of FIG. 1 of the drawing, it will be noted that the bottom wall of the chamber 45 is bevelled or conical in form to maintain the ball 43 clear of the pin 33, as is illustrated in said figure.

Having fully described my invention, what I claim as new and desire to secure by Letters Patent is:

1. In an air valve of the class described, a discharge control means comprising a valve plug, said plug having a bore opening through opposed ends thereof, an O-ring mounted in the lower portion of the bore, a valve stem arranged longitudinally of said bore, said stem being materially less in diameter than the diameter of said bore, a valve element fixed to the stem and operatively engaging said O-ring in checking discharge of air around the stem and through the bore of said plug, the upper end of the plug having a large diameter chamber, the bottom wall of said chamber being conical in form, a buoyant check valve normally seated on the bottom wall of said chamber and arranged below the upper end of said plug, a cap detachable with said plug and extending onto the plug to encircle the full depth of said chamber, said cap having a chamber larger in diameter than the diameter of the chamber in said plug and disposed above the upper surface of the plug, the outer end of the cap having a threaded vent aperture, an O-ring at the inner end of said vent aperture, and said buoyant valve operatively engaging said last named O-ring in checking discharge of air and/or water through the vent aperture of said cap.

2. A valve as defined in claim 1, wherein the plug is threaded throughout the full length thereof for detachable mounting in its support.

3. A valve as defined in claim 2, wherein the peripheral wall of the chamber of said plug is hexagon in cross-sectional form.

4. A valve as defined in claim 1, wherein the valve stem projects at all times into the chamber of said plug.

5. A valve as defined in claim 1, wherein a screw is in threaded engagement with the threaded vent of said cap, and said screw having a longitudinal vent passage therein.

References Cited in the file of this patent

UNITED STATES PATENTS

| | | |
|---|---|---|
| 2,276,136 | Woolley | Mar. 10, 1942 |
| 2,633,142 | Woolley | Mar. 31, 1953 |
| 2,780,234 | Russell | Feb. 5, 1957 |

FOREIGN PATENTS

| | | |
|---|---|---|
| 97,900 | Germany | July 26, 1898 |
| 624,314 | Germany | Jan. 17, 1936 |